Sheet 1.
3 Sheets.

J. S. & D. Lake.

Mower.

No. 11
No. 1116

Reissued Jan. 1, 1861.

Witnness.

W. York Atlee
A. Wm. Briemb

Jesse S. Lake
David Lake
By their Attorney
Thos. H. Dodge

Sheet 2.
3 Sheets.

J. S & D. Lake.

Mower.

No 11
No 1116

Reissued Jan. 1, 1861.

Witnesses.
W. York Atlee
A. W. Dreamer

Jesse S. Lake
David Lake
By their Attorney
Thos. H. Dodge

Sheet 3.
3 Sheets.
J. S & D. Lake.
Mower.
No 11
No 1116
Reissued Jan. 1, 1861.
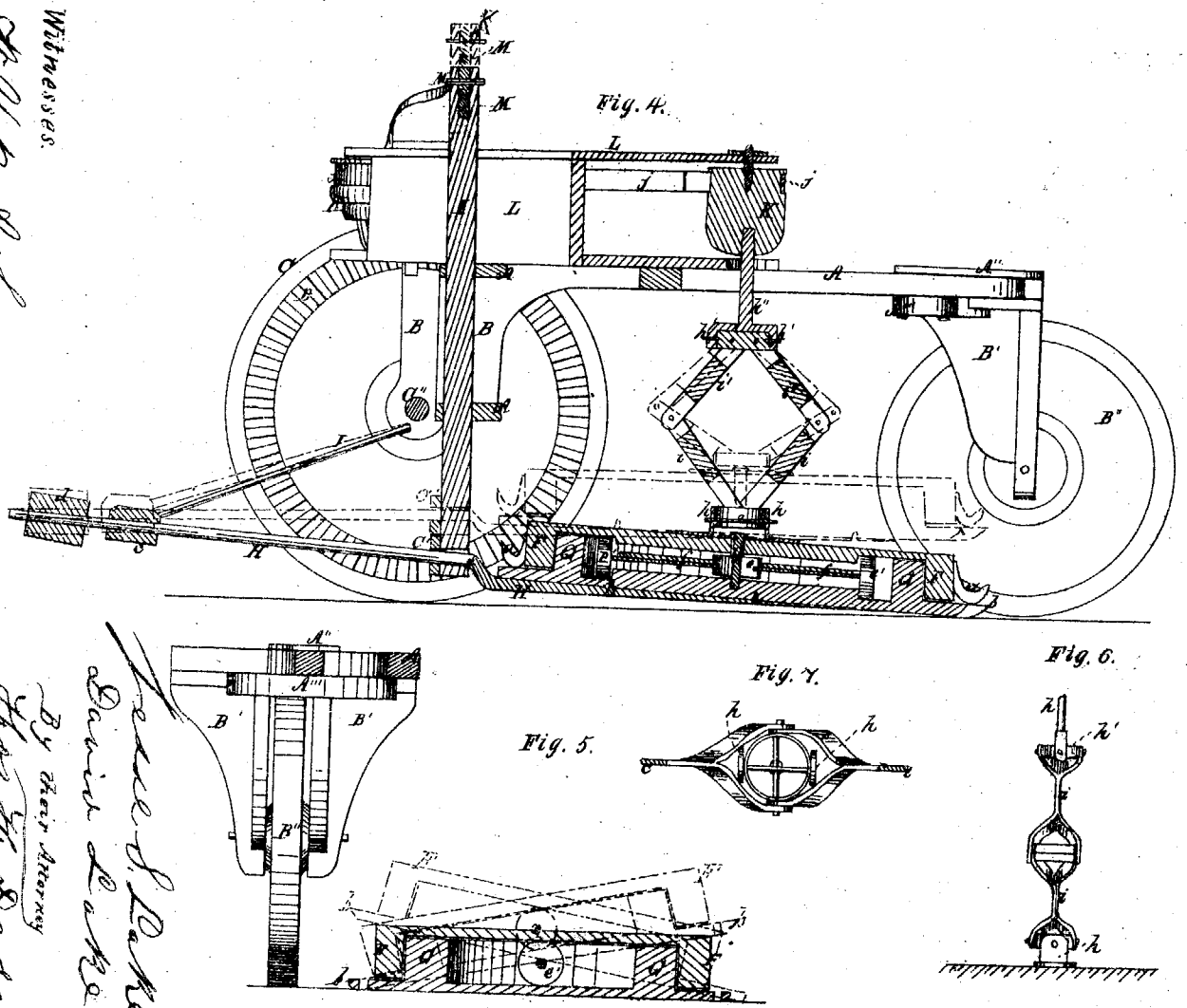
Witnesses.
H. Yorke Stevens
A. W. Dennis
Jesse S. Lake
David Lake
By their Attorney
Thos. H. Dodge

UNITED STATES PATENT OFFICE.

JESSE S. LAKE AND DAVID LAKE, OF SMITH'S LANDING, NEW JERSEY, ASSIGNORS TO JAMES A. SAXTON.

IMPROVEMENT IN GRASS-HARVESTERS.

Specification forming part of Letters Patent No. 9,137, dated July 20, 1852; Reissue No. 1,116, dated January 1, 1861.

*To all whom it may concern:*

Be it known that we, JESSE S. LAKE and DAVID LAKE, both of Smith's Landing, in the county of Atlantic and State of New Jersey, have invented certain new and useful Improvements in Mowing-Machines or Grass-Harvesters; and we do hereby declare that the following is a clear, full, and exact description of the same, reference being had to the accompanying drawings, forming a part of this specification, and in which—

Figure 1:
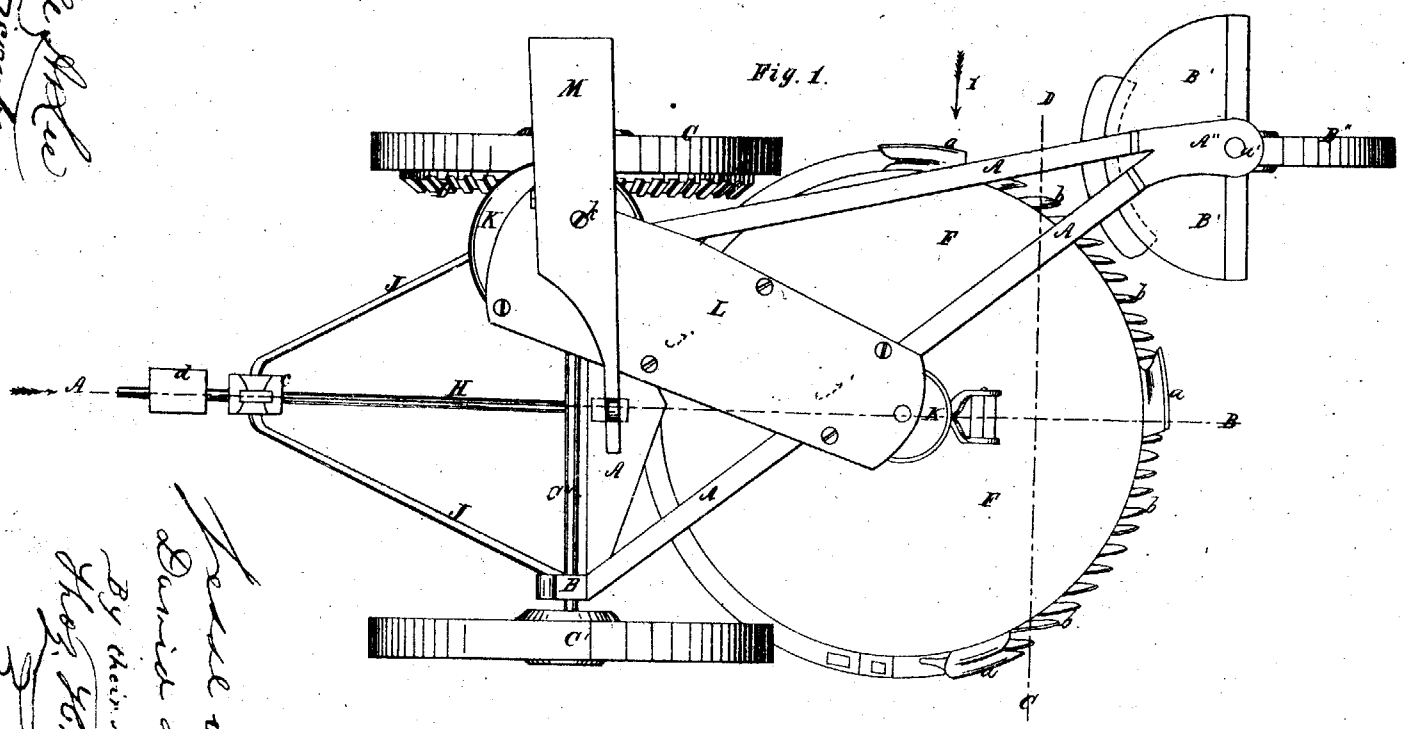
Figure 2:
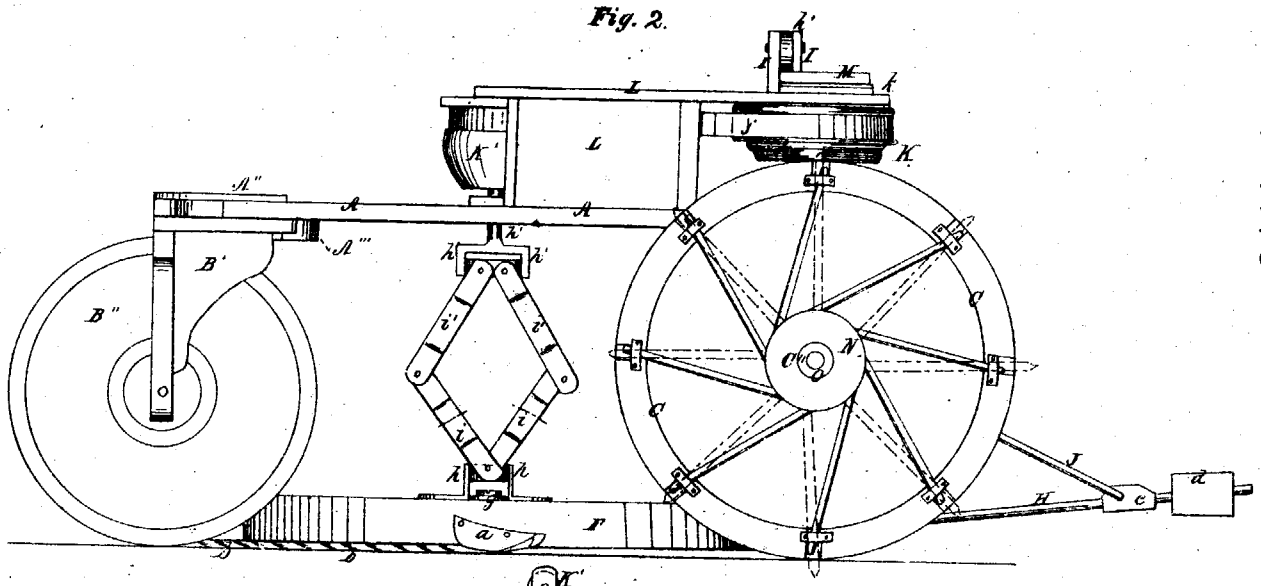
Figure 3:
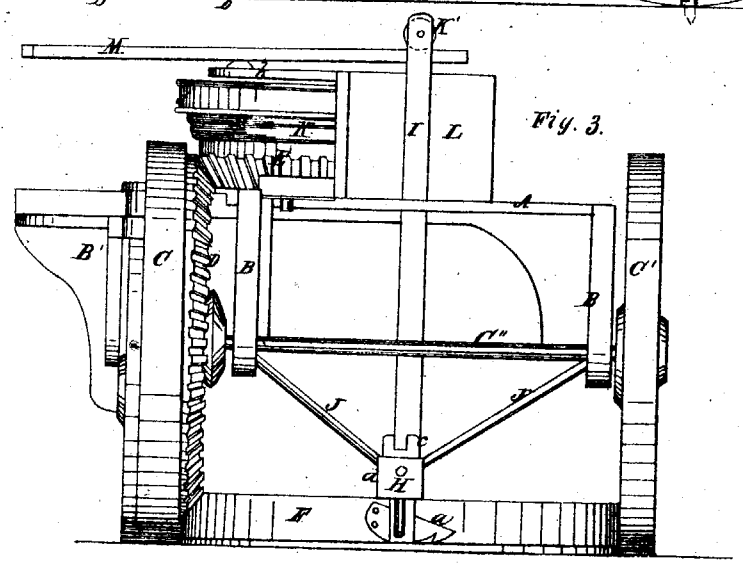

Figure 1 represents a plan view of a machine, showing one mode of applying our said improvements. Fig. 2 represents a side view of the machine as shown in Fig. 1, looking in the direction of arrow 1, the machine being represented as reversed, or facing in an opposite direction from Fig. 1. Fig. 3 represents a portion of the frame, wheels, and cutting apparatus, looking in the direction of arrow 2, Fig. 1. Fig. 4 represents a longitudinal section on line A B, Fig. 1, the cutting apparatus being shown in two different positions—one in black lines and the other in red. Fig. 5 represents a cross-section on line C D, Fig. 1, looking in the direction of arrow 2, the parts G and F being shown in different positions in full and dotted red lines. Figs. 6 and 7 represent detached parts of the mechanism used to operate the cutting apparatus.

Whenever it may be expedient to use one or more of the several parts or branches of our improvements separate from the rest, such part or parts may be used in connection with any suitable frame and gearing; and it is obvious that several parts of our improvements are applicable to various other mowing-machines in use.

Mowing-machines as heretofore constructed have not had their frames constructed with reference to that degree of simplicity, strength, and lightness which is desirable, while at the same time they combined the advantages of a triangular main frame and a single drive-wheel so arranged as to run on the outside of such frame. Nor have they been so constructed as to combine the advantages due to the combination of a triangular main frame, single drive-wheel, and a lever-seat for the driver. Nor have they been so constructed as to combine the advantages of a single drive-wheel and a leading swivel-wheel so arranged in relation to the main frame as to run on a line just outside of the standing grass.

That branch of our said improvements which is the subject of this patent is designed to accomplish the above advantages.

The accompanying drawings represent a mowing-machine with our said improvements applied thereto; but we do not deem a detailed description of all the various parts here necessary, since they are fully described in other reissue patents to us of even date herewith, and of which this is one division.

A A A represent a triangular frame, which is supported in front by a swivel-wheel, B″, whose journal turns in frame B′, which is pivoted to the front of the triangular frame A, or to a piece, A″, fastened thereto at *a*′. A piece, A‴, is fastened to the under side of the front of the main frame A, having a lip or projection, as shown in dotted lines, Fig. 1, so that the rear circular part of the swivel-frame B′ turns under the front of frame A and over the lip or projection of A‴. The rear of frame A is supported by two wheels, C C′, on a common axle, C″, which passes through the lower ends of the pieces B B, which are rigidly connected to the rear of the main frame, and are also united at bottom by piece A′. Wheels C C′ are arranged on the outside of frame A, wheel C′ being loose on shaft or axle C″, while wheel C is made fast thereto.

The finger-support platform or frame G, to the front of which are attached the guards or fingers *b*, is sustained by a metallic connection or lever, H, which passes loosely through a sliding piece, I, thence loosely through a hinged guide device, *c* J J, and has an adjustable weight, *d*, on its end. The upper inner part of G is grooved out and provided with a friction device consisting of a ring, *e*, with radiating loose shafts, on the ends of which are wheels *e*′, whereby the part F, to which the cutters are attached, can be rotated around the pivot *g*, fast in G, without undue friction. The friction device is free to run around. The part F is connected to the shaft *h*″ of pulley K by a series of jointed levers and swivel or hinged rings, the latter being placed between ears or lugs *h h h′ h′*, so that as the machine advances motion is communicated from gear D on wheel C to gear E and pulley K, and thence by band *j* to pulley K, and as the latter revolves a rapid rotary motion is communicated to the jointed levers *i i i′ i′* and frame F, and the grass is cut by the cutters *a* while it is held up by the guard-fingers *b*.

In the use of mowing-machines there is great strain upon the joints. Therefore a triangular frame will stand a much greater strain without yielding than a rectangular one, owing to the fact that the parts brace each other, and we have availed ourselves of this advantage, while at the same time we have made an important improvement, in that we have arranged or placed our main driving-wheel on the outside of the triangular frame, thus enabling the frame to be made much narrower, while at the same time the wheel is in a position where it can be examined or repaired in a more expeditious manner than if placed on the inside of the frame. Then, again, in those machines in which a triangular frame is used and the main drive-wheel is placed on the inside of the frame that portion which is on the outside of the wheel is constantly liable to strike against obstructions, which is not the case with our invention. We found a disadvantage, however, in having the main drive-wheel placed on the outside of the frame—viz., the weight of the cutting apparatus and frame was too far to the grassward to bear with proper and sufficient weight upon the drive-wheel to cause it to operate the cutters. To remedy this defect without adding to the actual weight to be drawn by the team induced us to combine with a triangular main frame a lever-seat for the driver, which should extend out over the main drive-wheel, so that the driver by moving out on said seat could cause the weight of the cutting apparatus and frame to be nearly balanced on the driving-wheel, although said wheel was placed on the outside of the triangular frame.

The drawings show a lever-seat, M, extending out over the drive-wheel C. This seat has a fulcrum at *k*, and is passed under a roller in the end of the sliding coupling-piece I, which supports the cutting apparatus.

To relieve the necks of the horses we provide the front of the frame with a swivel frame and wheel, B′ B″, the team being attached to frame B′ in any suitable manner. By the use of the swivel-wheel B″ and frame B′ the machine can be turned much easier and with far less danger of wrenching the machine or of upsetting it than if the horses were attached directly to the front of the frame.

As the main drive-wheel C and swivel-wheel B″ are arranged and combined with the triangular frame they run just outside of the standing grass and in nearly a line with each other. Consequently the machine is not exposed to more obstructions by the use of the swivel-wheel, nor is the swivel-wheel liable to get clogged up by the grass cut by the previous swath, since it runs on the ground which has been previously cleared by the action of the machine.

Having described one practical way in which that branch of our invention which forms the subject of this patent can be carried out, we wish it to be understood that we do not confine ourselves to a machine in which any particular cutting apparatus can be used; but

What we claim as our invention, and desire to secure by Letters Patent, is—

1. Placing the driving-wheel in a mowing-machine on the outside of the frame, in combination with a triangular-shaped frame on the inside of the wheel.

2. In a mowing-machine, the combination of the following elements, viz.: a triangular main frame, a single driving-wheel arranged on the outside of said frame, and a hinged lever-seat for the driver, for the purposes set forth.

3. In combination with the main frame of a mowing-machine, a single drive-wheel and a leading swivel-wheel so arranged in relation to each other and the cutting apparatus as that the said wheels shall run on lines just outside of the grass to be cut.

In witness whereof we have hereunto subscribed our names.

JESSE S. LAKE.
DAVID LAKE.

In presence of—
JOHN T. LAKE,
HENRY W. ROBINSON.